(12) United States Patent
Rovelli

(10) Patent No.: US 6,505,686 B2
(45) Date of Patent: Jan. 14, 2003

(54) IN SITU HORSESHOEING

(75) Inventor: Frank Rovelli, Oxnard, CA (US)

(73) Assignee: Vettec, Inc., Oxnard, CA (US)

( * ) Notice: Subject to any disclaimer, the term of this patent is extended or adjusted under 35 U.S.C. 154(b) by 0 days.

(21) Appl. No.: 09/872,575

(22) Filed: May 31, 2001

(65) Prior Publication Data

US 2002/0174993 A1 Nov. 28, 2002

Related U.S. Application Data

(60) Provisional application No. 60/282,338, filed on Apr. 6, 2001, and provisional application No. 60/287,283, filed on Apr. 26, 2001.

(51) Int. Cl.[7] .............................. A01L 11/00; A01L 1/00

(52) U.S. Cl. ............................................. 168/45; 168/4

(58) Field of Search ............................. 168/4, 45, 48.1, 168/DIG. 1

(56) References Cited

U.S. PATENT DOCUMENTS

| | | | | | |
|---|---|---|---|---|---|
| 4,896,727 A | * | 1/1990 | Busser | ........................... | 168/4 |
| 5,699,861 A | * | 12/1997 | Sigafoos | ...................... | 168/17 |
| 6,021,851 A | * | 2/2000 | Jacobs | ........................... | 168/4 |

* cited by examiner

*Primary Examiner*—Charles T. Jordan
*Assistant Examiner*—Elizabeth Shaw
(74) *Attorney, Agent, or Firm*—Louis J. Bachand

(57) ABSTRACT

A hoof shoe formed in situ and a method for building a hoof shoe, such as a horseshoe, of an intended shape in situ are disclosed, including cleaning the surface of the shoe area of horse hoof of debris, extruding onto the cleaned hoof surface from a common mix tip communicating with separate reactive resin precursors in first and second chambers a flowable horseshoe preform comprising an intimate curable mixture of reactive resin precursors at a profile depth and width generally conforming to the intended horseshoe shape, adhering the mixture to said shoe area surface, rapidly curing the mixture to a non-flowable mass by reaction of said resin precursors, and locally shaping the horseshoe mass to modify its extruded profile to a final intended horseshoe shape on the surface.

38 Claims, 5 Drawing Sheets

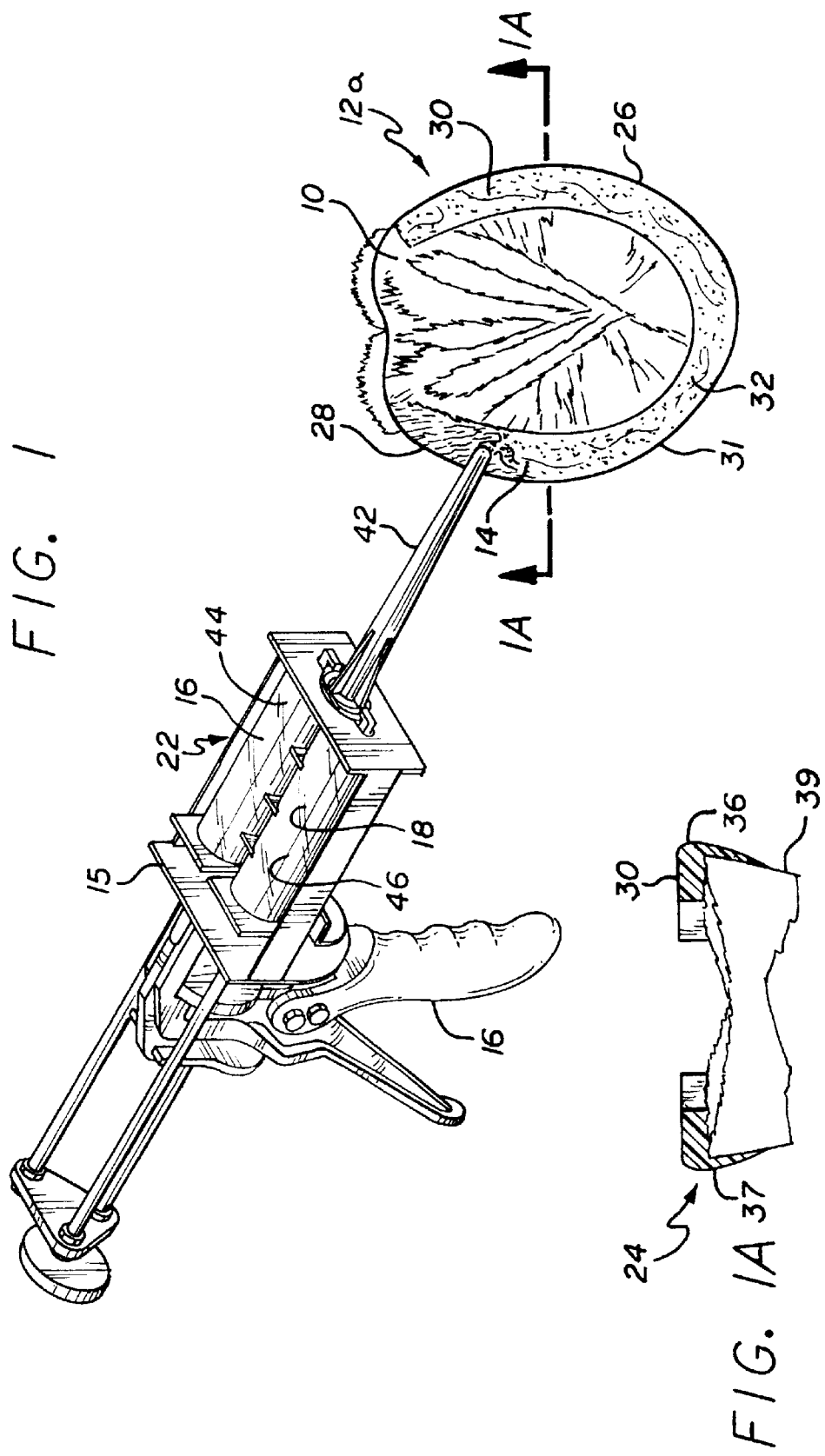

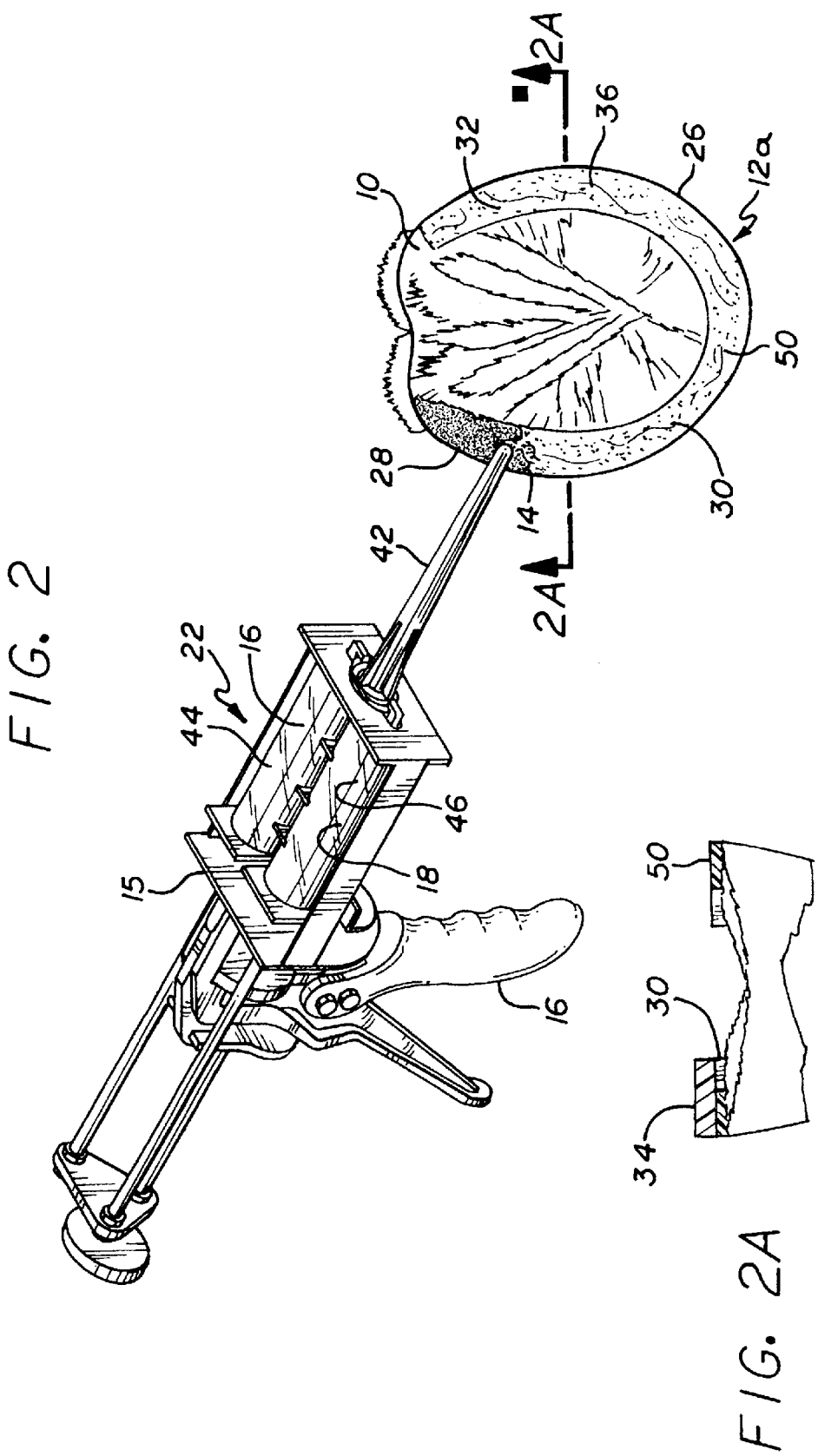

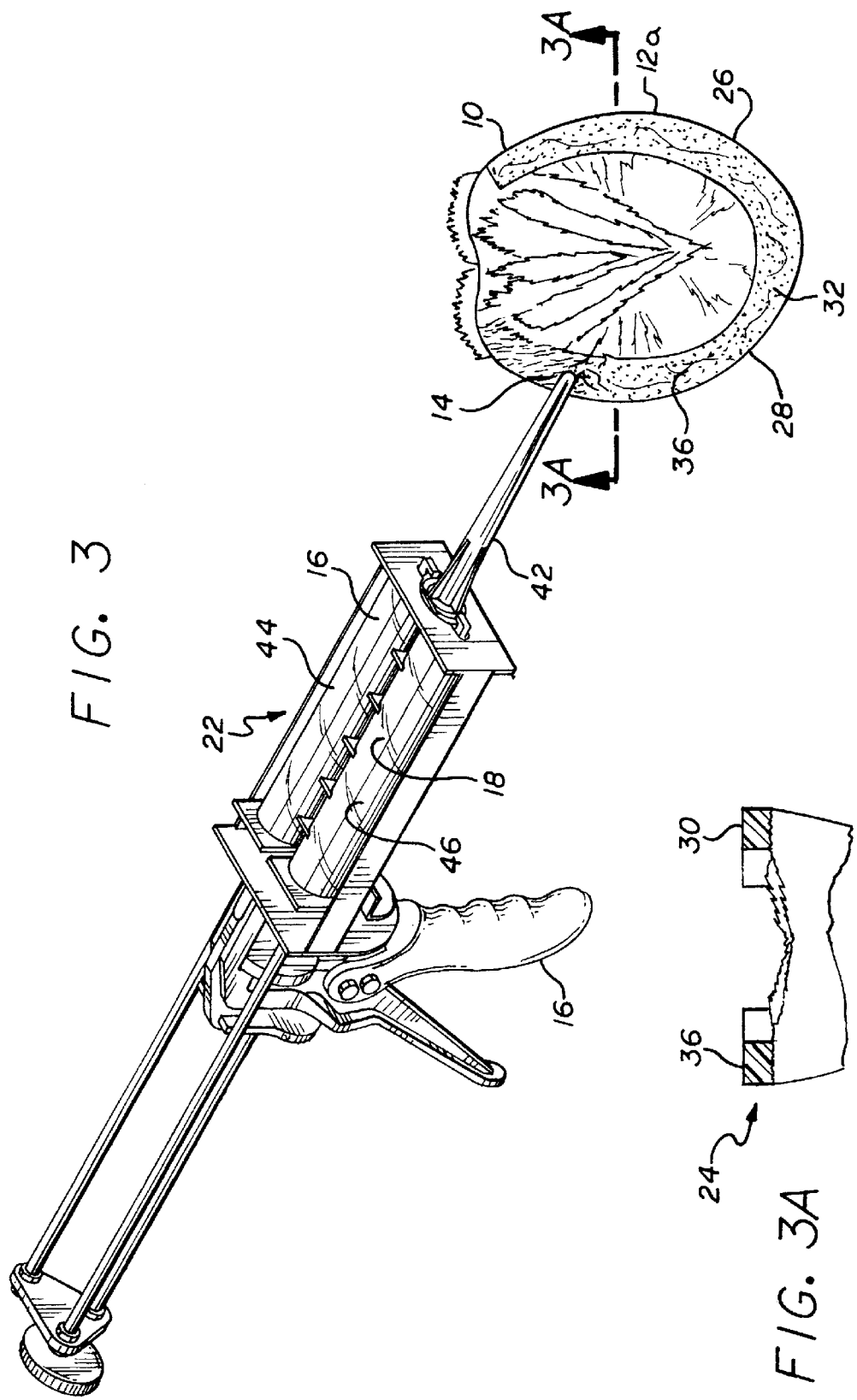

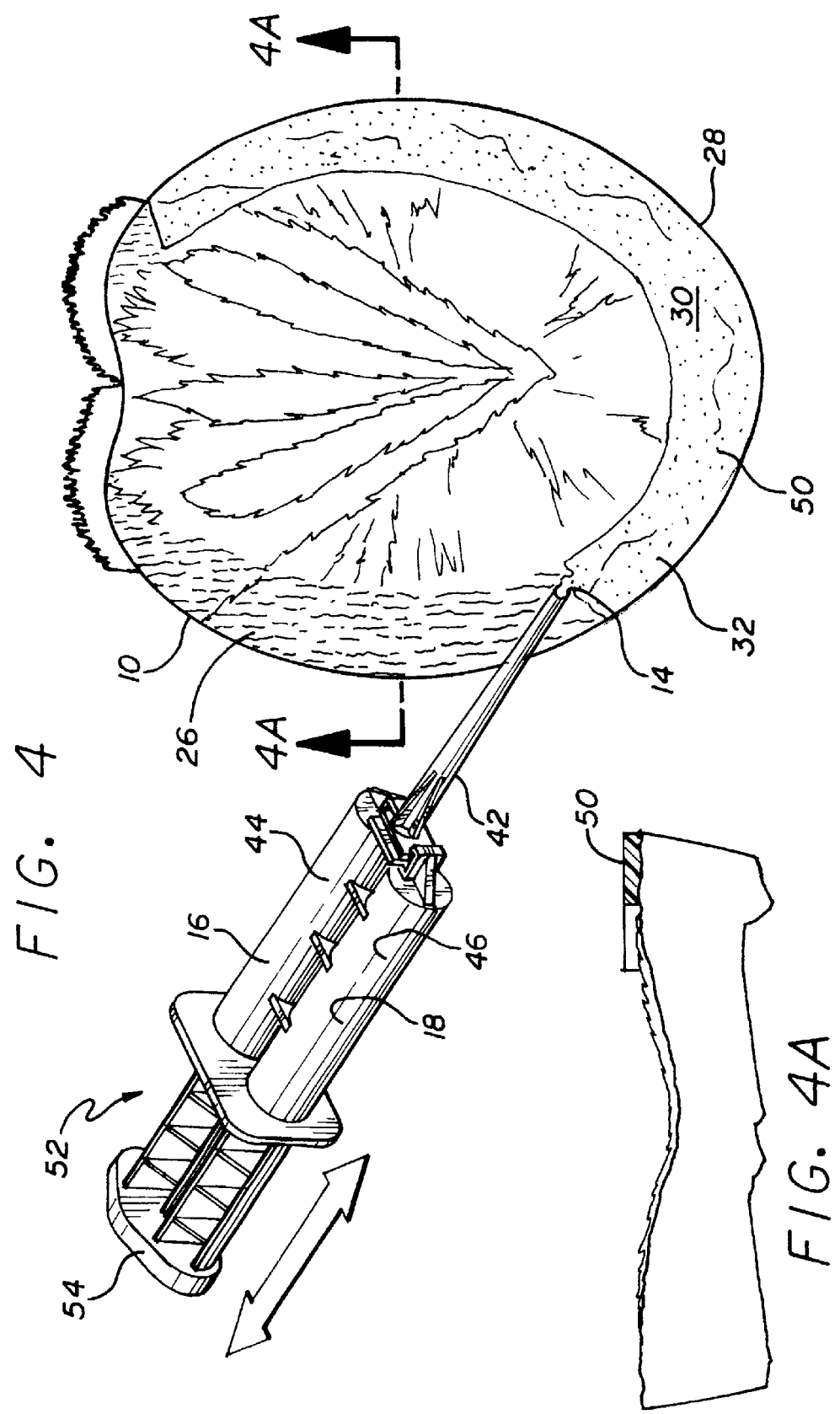

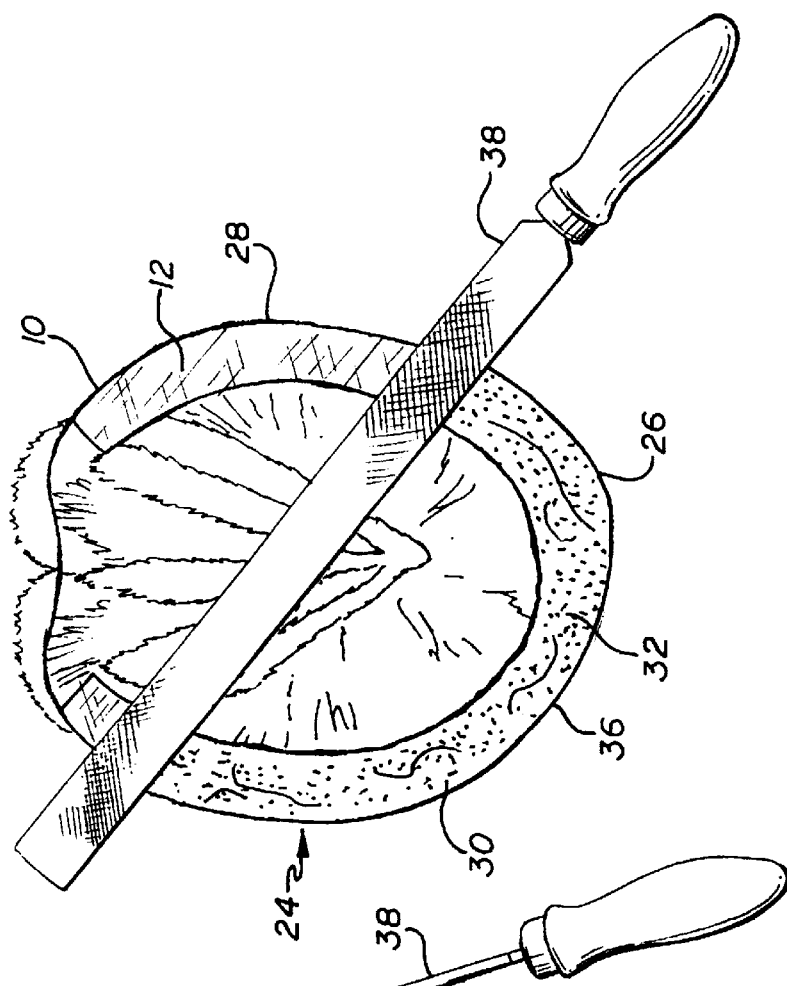
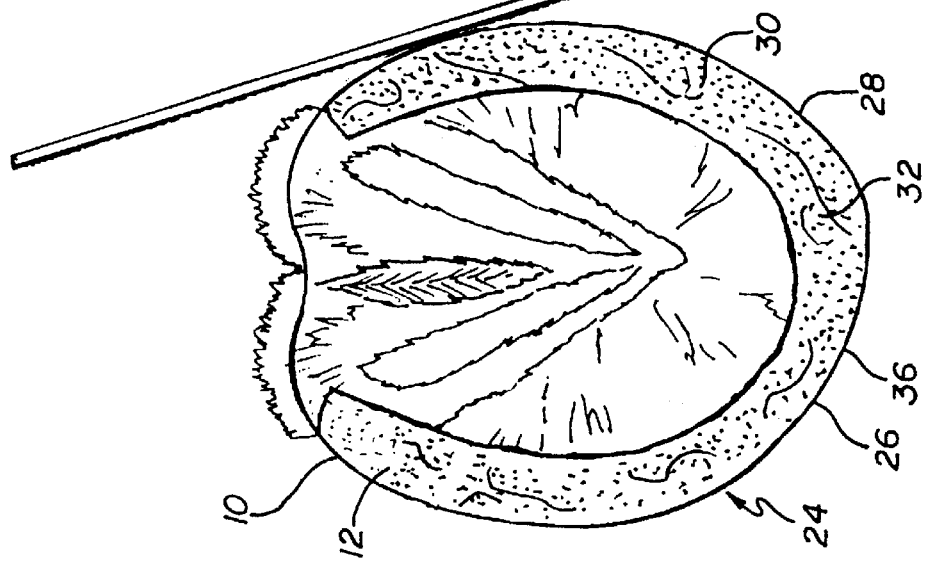

IN SITU HORSESHOEING

CROSS-REFERENCE TO RELATED APPLICATION

This application claims the benefit of U.S. Provisional Applications Serial No. 60/282,338, filed Apr. 6, 2001, and Ser. No. 60/287,283, filed Apr. 26, 2001.

STATEMENT REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

This invention relates to horseshoeing and, more broadly to the addition to hoofs of various animals needing hoof protection. More particularly, the invention provides the benefits of shoeing to horses and other animals in an especially convenient and effective manner. The invention provides, for example, with respect to horseshoes, for the shoeing of horses with a resin composition that sets up instantly in situ on the horse's hoof in the near form of a horseshoe and is then trimmed to a perfect shape. The invention enables the periodic renewal of horseshoes with a minimum of effort, readily affords local variation in shoe thickness to compensate for hoof irregularities, and ensures an effective protection for the horse's hoof.

2. Description of the Related Art

Horseshoes have been fabricated of metals for centuries and more recently from synthetic materials, but always by prefabricating the shoe and then applying the prefabricated shoe onto the horse's hoof. See, for example, U.S. Pat. No. 5,699,861 to Sigafos where a kit for horseshoeing is described. The problems of prefabricated horseshoes, whether of metal or plastic is that the shape of the hoof to be shod varies making the application of a prefabricated shoe a process of trial and error, albeit a highly skilled art. Also, some hoofs need a thicker section in one place than in another. It is economically infeasible to market or inventory all the possibilities that may be encountered.

BRIEF SUMMARY TO THE INVENTION

What is needed is a more flexible approach, one that allows customizing of the shoes to the hoof on site without onerous or costly effort. It is accordingly an object of the invention to provide an in situ shoeing method and product. It is a further object to provide a system for the creation on the hoof itself of the shoe. It is a further object to reduce inventory requirement to merely a dispensable resin system that is applicable to the hoof in custom fashion. A further object of the invention is to extrude onto a prepared hoof shoeing surface an intimate admixture of reactive resin components in a profile approximating the intended shoe, that is non-flowing when applied, and modifiable to the desired exact contour to achieve any thickness, any thickness variation along the extent of the shoe, and of course a precise registration of the deposited resin system with the hoof contour without difficult bending of strong, prefabricated materials. It is a still further object to provide a dispensed resin system typically comprising A and B sides of a resin in the form of reactive thermosetting resin precursors, e.g. comprising urethane resin precursors, that is thixatroped to have a consistency allowing the resin during reaction to a cured or hardened state to stand on the hoof shoeing surface without excessive flow off the surface. Another object is to modify the exotherm in cure that may be sensed by the horse by first laying down a thin layer of resin that has a minor exotherm and after it cures, a matter of seconds usually, depositing the balance of the resin system in the shoe profile. A further object is the provision of an animal or horse shoe of an intended profile comprising the reaction product of reactive resin precursors cured in substantially said intended profile in situ on a horse hoof surface, more particularly a synthetic organic resin horseshoe cured in situ on a horse hoof surface, and the combination of a horse having a hoof, and a synthetic organic resin horseshoe attached to said hoof, said horseshoe having been cured in situ on the horse hoof. Other objects include: forming while shoeing a moisture barrier on the hoof surface, through the adhesion of the applied resin mass to the hoof surface material; providing a repair system for shoed hooves by addition of more resin mass where wear has occurred, which is effective because the resin mass in many embodiments will adhere to its previously cured self; preventing the horse from pulling a shoe, i.e. removing a shoe on an adjacent hoof with another hoof through a purchase gained at the so-called lip protruding rearwardly from the conventional horseshoe by eliminating the lip protrusion altogether with careful tailoring of the shoe so as to be narrow on the hoof; equalizing pressure on the hoof all about the hoof surface as an improvement over the use of nails which become as many as seven or more points of pressure; enabling shoeing of horses whose hooves are worn too much to tolerate nailing, but will accept a shoe formed in situ; adding spring to the horse's step through the resiliency of the in-situ-formed horseshoe, the profile of which can be modified to add a spring function; improving traction by customizing the shoe bottom surface to the anticipated terrain; adding color at the shoe, bodily or in accents, or other optical effects including patterns and glitter to reflect the stable that trained the horse, or a cause or event; and to have or provide a layer of resiliency at the hoof for comfort and longevity of the horse.

These and other objects of the invention to become apparent hereinafter are realized in a method for building a horseshoe of an intended shape in situ, including cleaning the surface of the shoe area of horse hoof of debris, depositing onto the cleaned hoof surface a flowable horseshoe preform comprising an intimate curable mixture of reactive resin precursors having a depth and width of profile generally conforming to the intended horseshoe shape, adhering the mixture to the shoe area surface, curing the mixture to a non-flowable mass by reaction of the resin precursors before substantial portions of the mixture flows from the shoe area surface, and then locally shaping the horseshoe mass to modify its deposited profile to conform to the final intended horseshoe shape on the shoe area surface.

In this and like embodiments of the invention, typically, the invention further includes selecting as the mixture a mixture that self-adheres to the shoe area surface, precoating the shoe area surface with a thin layer of the mixture having less than 25% of the profile depth of the intended horseshoe shape and a lower exotherm than the full profile depth, and at least partially curing the thin layer before depositing additional mixture onto the thin layer, and selecting as the mixture resin precursors thermosetting resin precursors, such as thermosetting urethane resin precursors.

In a further embodiment, the invention provides a method for building a horseshoe of an intended shape in situ, extruding onto a cleaned hoof surface a flowable horseshoe preform comprising an intimate curable mixture of reactive resin precursors having a depth and width of profile generally conforming to the intended horseshoe shape in the shoe area surface adhering relation, curing the mixture in situ to a non-flowable mass by reaction of the resin precursors to retain substantially all the mixture on the shoe area surface, and then locally mechanically shaping the extruded mass, e.g. with a rasp, to modify its profile to conform to the final intended horseshoe shape on the shoe area surface.

In this and like embodiments, typically, the invention further includes selecting as the mixture a mixture that self-adheres to the shoe area surface, providing the reactive resin precursors in separate chambers arranged for intimate admixture of the precursors in a common passage, and delivering the mixture of the reactive resin precursors from the common passage onto the shoe area surface, selecting as the mixture resin precursors thermosetting resin precursors, such as thermosetting urethane resin precursors, selecting as a side A reactive resin precursor a precursor comprising diphenylmethane diisocyanate and as a side B reactive resin precursor a precursor comprising a polyol, such as a polyoxypropylene ether polyol, and suitably an amine such as a thixatroping amine, e.g. a primary or secondary amine, such as meta xylene diamine, and also a coupling agent, e.g. one comprising a silane in side A and/or side B in amounts of from 0.1% to 5% and preferably about 3% by weight of the resin precursor mixture. A fumed silica can be added to thixatrope the mixture, e.g. in both side A and side B in amounts of from 3 to 10% by weight in each side, and maintaining in the reactive resin precursor mixture from 3 to 10% by weight fumed silica.

In a further aspect of the method, as noted above, there can be a precoating of the shoe area surface with a thin layer of a mixture of reactive resin precursors having less than 5 to 15% of the profile depth of the intended horseshoe shape and a lower exotherm than the full profile depth, and at least partial curing of the thin layer before extruding additional mixture onto the thin layer.

The invention further contemplates the products of the foregoing methods.

In another, more compositionally specific, form of the invention method, the invention provides a method for building a horseshoe in situ including cleaning the surface of the shoe area of horse hoof of debris, extruding onto the cleaned hoof surface a flowable horseshoe preform comprising an intimate curable mixture of urethane resin precursors comprising diphenylmethane diisocyanate, polyoxypropylene oxide polyol, and meta xylene diamine (1,3-benzene dimethane amine) depth and width profile greater than the intended horseshoe shape, maintaining fumed silica in the mixture in an amount effective to keep substantially all of the mixture on the shoe area surface, curing the mixture to a non-flowable mass in less than one minute, and shaping the horseshoe preform to reduce its profile to a final intended horseshoe shape on the surface, and the product of this method.

In another, more apparatus specific, method, the invention provides the method for building a horseshoe of an intended shape in situ including extruding onto the cleaned hoof surface from a common mix tip communicating with separate reactive resin precursors in first and second chambers a flowable horseshoe preform comprising an intimate curable mixture of the reactive resin precursors at a profile depth and width generally conforming to the intended horseshoe shape, adhering the mixture to the shoe area surface, curing the mixture to a non-flowable mass by reaction of the resin precursors within less than about one minute, and locally shaping the horseshoe mass to modify its extruded profile to the final intended horseshoe shape on the surface.

In its further product aspects, the invention provides a horseshoe of an intended profile, the horseshoe comprising the reaction product of reactive resin precursors cured in substantially the intended profile in situ on a horse hoof surface, a synthetic organic resin horseshoe cured in situ on a horse hoof surface, in combination: a horse having a hoof, and a synthetic organic resin horseshoe attached to the hoof, the horseshoe having been cured in situ on the horse hoof, and in combination: a horse having a hoof, and a synthetic organic resin horseshoe attached to the hoof, the horseshoe having been cured in situ on the horse hoof from an intimate curable mixture of urethane resin precursors comprising diphenylmethane diisocyanate, polyols, and meta xylene diamine and fumed silica deposited on the hoof at a depth and width profile approximating the intended horseshoe shape.

In its broader aspects, the invention provides hoof shoes for beeves and like hoofed animals, and a method therefor including building a animal hoof shoe of an intended shape in situ including cleaning the surface of the shoe area of hoof of debris, extruding onto the cleaned hoof surface from a common mix tip communicating with separate reactive resin precursors in first and second chambers a flowable hoof shoe preform comprising an intimate curable mixture of the reactive resin precursors at a profile depth and width generally conforming to the intended hoof shoe shape, adhering the mixture to the shoe area surface, curing the mixture to a non-flowable mass by reaction of the resin precursors within less than about two minutes, and locally shaping the hoof shoe mass to modify its extruded profile to the final intended hoof shoe shape on the surface, the hoof shoe product so made, and specifically a synthetic organic resin hoof shoe cured in situ on a hoof surface per se and in combination with such a hoof.

In another aspect the invention provides a moisture-proofing of the shoed hoof surface, the method including protecting a horse hoof from moisture accumulation between shoe and hoof, including cleaning the hoof surface of debris and forming on the cleaned hoof an adherent resin mass that adheres to the hoof surface in moisture excluding relation.

In other aspects the invention provides the method of protecting a horse hoof from uneven pressure on the hoof from horseshoe, including clearing from the hoof all nails and previous shoe, and forming on the cleaned hoof an adherent resin mass that adheres to the hoof surface in shoe-forming relation, the method of maintaining a horse hoof shoe against wearing from an intended shape, including cleaning the shoe surface of debris, and restoring the intended shape to the shoe through the added application of an adherent resin mass that adheres to the hoof surface, the method of increasing the stepping comfort of a horse, including providing and maintaining as the horse hoof shoe a shoe comprising a resin having a resilience to be reduced temporarily in vertical profile when the horse puts its weight upon the shoe, and a synthetic organic resin hoof shoe hardened in situ on a hoof, the hoof-shaped resin exhibiting an optical effect other than its natural appearance.

BRIEF DESCRIPTION OF THE SEVERAL VIEWS OF THE DRAWINGS

The invention will be further described in conjunction with the attached drawings in which:

FIG. 1 is an oblique view of the extrusion application of a flowable curable resin mixture horseshoe preform onto a hoof surface from an applicator gun;

FIG. 1A is taken on line 1A—1A in FIG. 1;

FIG. 2 is a view like FIG. 1 of the application of a precoating of resin in advance of a full profile application;

FIG. 2A is taken on line 2A—2A in FIG. 2;

FIG. 3 is a view like FIG. 1 of the application of a full profile preform using a larger applicator gun;

FIG. 3A is taken on line 3A—3A in FIG. 3;

FIG. 4 is a view like FIG. 2 of the extrusion application of a precoating of resin using a hand-operable dispenser;

FIG. 4A is taken on line 4A—4A in FIG. 4;

FIG. 5 is a plan view of the cured hoof shoe preform being modified to its intended shape; and, FIG. 6 is a view like FIG. 5 showing further modification of the hoof shoe.

DETAILED DESCRIPTION OF THE INVENTION

The invention provides the ultimate in shoeing convenience. A resinous mixture is deposited in approximately the intended shoe shape and when rigid is trimmed to the intended shoe shape. The use of an in situ formed shoe eliminates the need for an inventory of various shoes, and the need for the farrior's laborious fashioning of metal to just the right form. If the hoof is less than perfect, or the horse in need of a particular kind of shoe, the amount and disposition of resin can be tailored by a simple adjustment in the application steps to compensate. The invention enables the customizing of the shoe to the horse in a remarkably easy manner.

With reference now to the drawings in detail in FIGS. 1 and 1A, hoof 10 has a surface 26 defining a shoe area 28. Shoe area 28 is provided with a shoe 12 formed immediately on the hoof, i.e. in situ, from a mixture 14 of reactive resin components delivered from dual chambers 16, 18 of dispenser 22 carried in applicator 15 that delivers the mixture by pumping the hand grip 16.

The invention method for building in situ a horseshoe 12 of an intended shape 24 (shown in FIGS. 5 and 6), includes upturning the horse hoof 10 for treatment, and cleaning the surface 26 of the shoe area 28 of horse hoof of debris. A shoe preform 32 is formed on the shoe area 28 by depositing onto the surface 26 a flowable intimate curable mixture 14 of reactive resin precursors having a suitable depth, e.g. ½ inch, and width, e.g. 1 inch, of profile 30, see FIG. 1A. Preform profile 30 generally conforms to the intended horseshoe shape 24. Suitably, the mixture 14 self-adheres, as with a urethane resin, or is made to adhere, to the shoe area surface 26. The mixture 14 cures in place under any of various cure regimes including moisture, heat, light, catalysts, etc., suitably at ambient temperatures, preferably of 65 to 85 degrees °F. for the resin system exemplified below. Mixture 14 having the profile 30 of the preform 32 cures to a non-flowable mass 36 by reaction of the resin precursors before substantial portions of the mixture flow from the shoe area surface 26. In some cases the mass 36 is deliberately extended as a skirt 37 to cover the immediately adjacent hoof areas 39 beyond the hoof surface 26.

Following cure, which is accomplished in one or two minutes, or faster, such as 30 seconds, the perform 32 is locally shaped with a rasp 38 or other tool to have the intended shoe shape 24 with the surface finish and perimeter contour desired, see FIGS. 5 and 6.

With further reference to FIGS. 1 and 1A, and also to FIGS. 3 and 3A in which a larger dispenser is used such as a 6 ounce size cartridge rather than the three ounce shown in FIGS. 1 and 1A, the reactive precursor mixture 14 is suitably extruded onto the cleaned hoof surface area 26 from a common mix tip 42 comprising extended flights of mix elements as is known and communicating with separate reactive resin precursors 44, 46 in first and second chambers 16, 18 of the dispenser 22. The flowable horseshoe preform 32 is thus extruded as an intimate, curable mixture of the reactive resin precursors 44, 46 at the above-noted profile 30 depth and width and generally conforming to the intended horseshoe shape 24, Following adhesion and cure to a non-flowable mass 36 that defines the unfinished shoe 12a, the user locally shapes the horseshoe mass to modify its extruded profile to the final intended horseshoe shape 24 on the surface 26, as shown in FIGS. 5 and 6.

Suitable resin systems herein are the thermosetting synthetic organic resins formed from A and B sides comprising reactive component precursors of the resin. Such resins cure rapidly, are low in shrinkage, are hard and tough, are formable with tools such as rasps in less than two minutes, preferably, do not have excessive exotherms that might injure or discomfort the animal, and self-adhere to the surface 26. Other resins formulations that set up or cure quickly without animal damaging exotherms, that are tough, that are hoof adherent or adherable to the hoof through intermediary adhesives, and are otherwise suitable are likely candidates for use in the invention. Preferably, the resins are reaction products of reactive precursors that can be mixed and delivered rapidly. Epoxy, vinyl ester, acrylic, polyester, and other resins formulations that set up or cure quickly without animal damaging exotherms, that are tough, that are hoof adherent or adherable to the hoof through intermediary adhesives, and are otherwise suitable are likely candidates for use in the invention in addition to the urethane resins. Such suitable resin systems herein are resins having the requisite strength and forming properties, preferably have low volatility and odor, and can include, among thermosetting resins, epoxy resins, vinyl ester resins, such as the auto-cure or light-cure resin products of diacrylates, and dimethacrylates of Bisphenol-A ethyloxlate resins, corresponding bis-F resins, the auto-cure or light-cure resin products of acrylic functionality, unsaturated polyester resin oligomers, including those based on the condensation products of maleic and phthalic anhydrides or acids of glycols, polyester resins in combinations of monomers including styrene, divinylbenzene, ethyl acrylate, methylmethacrylate, and other acrylates, and auto-curing resins above that are catalyzed by various peroxides and promoted by various amines. Thermoplastics such as polyamides, acrylonitrile butadiene styrene polymers, polycarbonates, polyphenylene oxides, polysulfones, polyphenylene sulfides, and fluoropolymers can be used where the strength and other properties are adequate to horseshoe use.

Preferred resins herein are urethane resins. These resins are formed from reactive precursors of diisocyanates, e.g. aliphatic, and preferably aromatic diisocyanates, on one side and polyols, either aliphatic or aromatic polyols, on the other, with other additives that act as coupling agents, such as silanes in amounts from 0.1 to 5% by weight, that extend the polymer chains, add thixatropy, such as and preferably primary or secondary amines, and/or fumed silicas, control reaction rate and thixatropy, such as amines, and/or that catalyze the reaction. Preferred urethane resins include thixatropic compositions having as the side A reactive resin precursor diphenylmethane diisocyanate and as the side B reactive resin precursor polyoxypropylene oxide polyether polyols and meta xylene diamine, a coupling agent such as one or more silanes at about 3% by weight of the reaction mixture, Quadrol, for improved snap set and rasping qualities, and thixatroping agents.

As noted above, and with reference to FIGS. 2 and 2A, and 4 and 4A, there can be a precoating of the shoe area surface 26 with a thin layer 50 of a mixture 14 of reactive resin precursors 44, 46, as just described, but having less than 25% and as little as 5 to 15% of the profile 30 depth of the intended horseshoe shape 24. Such a lesser mass of reactants will have a lower exotherm than the full profile depth, assuming the same reactants. The thin layer 50 is at least partially cured before extruding additional mixture 34 onto the thin layer. For delivery of small quantities of resin, a dispenser 52 with a thumb-pressed piston 54, shown in FIG. 4, is advantageously used in preference to the large or intermediate size dispenser 22.

Further details on suitable urethane resins prepared from one or more isocyanates, catalysts, various polyols, and amines are disclosed in U.S. Pat. No. 4,869,400, the disclosure of which is hereby incorporated herein, provided the foregoing criteria are met.

EXAMPLE

A reactive urethane resin mixture typically useful in the invention is prepared in two parts (A and B sides) of equal volume for dispensing from a dual cartridge dispenser in which dual pistons on a common yoke extrude the separate reactive components through a manifold and into a mix tip comprising a series of baffles arranged to cut and recombine the mixing materials as they progress through the mix tip. All parts and percentages are by weight:

| Component | Percent |
|---|---|
| Part A | |
| Isocyanate Prepolymer (Rubinate 1660 or MDI) | 78. |
| D.B. Castor Oil | 21. |
| Silane (Silquest A-1310) | 1. |
| Silane A-187 | 2. |
| Part B | |
| Polyol (Multranol 3901) | 54. |
| Polyol (Multranol 4012 | 26. |
| Quadrol (N'N'N'N'-tetrakis(2-hydroxyethyl or propyl ethylene diamine) | 18. |
| MXDA (1,3-benzene diamino methane) | 2.6 |
| Catalyst (Coscat 83) | 0.25 |

The two sides are packaged in separate sides of a dual chamber dispenser and dispensed as noted above onto the horse hoof that has been cleaned and otherwise prepared to receive the in-situ horseshoe.

The invention thus provides a method for building a horseshoe of an intended shape in situ, using a flowable horseshoe preform comprising an intimate curable mixture of reactive resin precursors having a depth and width of profile generally conforming to the intended horseshoe shape, adhering the mixture to the shoe area surface, curing the mixture to a non-flowable mass by reaction of the resin precursors before substantial portions of the mixture flows from the shoe area surface, and then locally shaping the horseshoe mass to modify its deposited profile to conform to the final intended horseshoe shape on the shoe area surface. The invention further provides the product of the method and more broadly an in situ formed animal shoe comprising the reaction product of reactive resin precursors cured in substantially said intended profile in situ on a horse hoof surface.

The foregoing objects are thus met.

I claim:

1. A method for building a horseshoe of an intended shape in situ, including cleaning the surface of the shoe area of horse hoof of debris, depositing onto the cleaned hoof surface a flowable horseshoe preform comprising an intimate curable mixture of reactive resin precursors having a depth and width of profile generally conforming to said intended horseshoe shape, adhering said mixture to said shoe area surface, curing said mixture to a non-flowable mass by reaction of said resin precursors before substantial portions of said mixture flows from said shoe area surface, and then locally shaping said horseshoe mass to modify its deposited profile to conform to said final intended horseshoe shape on said shoe area surface.

2. The method according to claim 1, including also selecting as said mixture a mixture that self-adheres to said shoe area surface.

3. The method according to claim 1, including also precoating said shoe area surface with a thin layer of said mixture having less than 25% of the profile depth of said intended horseshoe shape and a lower exotherm than said full profile depth, and at least partially curing said thin layer before depositing additional mixture onto said thin layer.

4. The method according to claim 1, including also selecting as said mixture resin precursors thermosetting resin precursors.

5. The method according to claim 1, including also selecting as said resin precursors thermosetting urethane resin precursors.

6. The horseshoe product of claim 1.

7. A method for building a horseshoe of an intended shape in situ, including cleaning the surface of the shoe area of horse hoof of debris, extruding onto the cleaned hoof surface a flowable horseshoe preform comprising an intimate curable mixture of reactive resin precursors having a depth and width of profile generally conforming to said intended horseshoe shape in said shoe area surface adhering relation, curing said mixture in situ to a non-flowable mass by reaction of said resin precursors to retain substantially all said mixture on said shoe area surface, and then locally mechanically shaping said extruded mass to modify its profile to conform to said final intended horseshoe shape on said shoe area surface.

8. The method according to claim 7, including also selecting as said mixture a mixture that self-adheres to said shoe area surface.

9. The method according to claim 7, including also providing said reactive resin precursors in separate chambers arranged for intimate admixture of the precursors in a common passage, and delivering the mixture of said reactive resin precursors from said common passage onto said shoe area surface.

10. The method according to claim 9, including also selecting as said mixture resin precursors thermosetting resin precursors.

11. The method according to claim 10, including also selecting as said reactive resin precursors thermosetting urethane resin precursors.

12. The method according to claim 11, including also selecting as a side A reactive resin precursor a precursor comprising diphenylmethane diisocyanate.

13. The method according to claim 11, including also selecting as a side B reactive resin precursor a precursor comprising a polyol.

14. The method according to claim 13, including also selecting as a side A reactive resin precursor a precursor comprising diphenylmethane diisocyanate.

15. The method according to claim 14, including also incorporating into side A and/or Side B a coupling agent comprising a silane.

16. The method according to claim 15, including also adding said silane in amounts of from about 0.1% to about 5% by weight in each said side where present.

17. The method according to claim 11, including also selecting as a side B reactive resin precursor a precursor comprising a thixatroping amine.

18. The method according to claim 11, including also selecting as a side B reactive resin precursor a precursor comprising a thixatroping primary or secondary amine.

19. The method according to claim 11, including also selecting as a side B reactive resin precursor a precursor comprising a thixatroping amine comprising meta xylene diamine.

20. The method according to claim 7, including also incorporating into said reactive resin precursor mixture from 0.1% to 5% by weight silane.

21. The horseshoe product of claim 20.

22. The method according to claim 7, including also maintaining in said reactive resin precursor mixture from about 3 to about 10% by weight fumed silica.

23. The method according to claim 7, including also incorporating into said reactive resin precursor mixture from about 4% to about 32% by weight Quadrol.

24. The method according to claim 7, including also precoating said shoe area surface with a thin layer of a mixture of reactive resin precursors having less than 15% of the profile depth of said intended horseshoe shape and a lower exotherm than said full profile depth, and at least partially curing said thin layer before extruding additional mixture onto said thin layer.

25. The horseshoe product of claim 7.

26. A method for building a horseshoe in situ including cleaning the surface of the shoe area of horse hoof of debris, extruding onto the cleaned hoof surface a flowable horseshoe perform comprising an intimate curable mixture of urethane resin precursors comprising diphenylmethane diisocyanate and a polyoxyproplyene oxide polyol and meta xylene diamine at a depth and width profile greater than the intended horseshoe shape at a viscosity to remain on said surface, curing said mixture to a non-flowable mass in less than one minute, and shaping said horseshoe preform to reduce its profile to a final intended horseshoe shape on said surface.

27. The horseshoe product of claim 26.

28. A method for building a horseshoe of an intended shape in situ including cleaning the surface of the shoe area of horse hoof of debris, extruding onto the cleaned hoof surface from a common mix tip communicating with separate reactive resin precursors in first and second chambers a flowable horseshoe preform comprising an intimate curable mixture of said reactive resin precursors at a profile depth and width generally conforming to said intended horseshoe shape, adhering said mixture to said shoe area surface, curing said mixture to a non-flowable mass by reaction of said resin precursors within less than about one minute, and locally shaping said horseshoe mass to modify its extruded profile to said final intended horseshoe shape on said surface.

29. A horseshoe of an intended profile, said horseshoe comprising the reaction product of reactive resin precursors cured in substantially said intended profile in situ on a horse hoof surface.

30. A synthetic organic resin horseshoe cured in situ on a horse hoof surface.

31. In combination: a horse having a hoof, and a synthetic organic resin horseshoe attached to said hoof, said horseshoe having been cured in situ on said horse hoof.

32. In combination: a horse having a hoof, and a synthetic organic resin horseshoe attached to said hoof, said horseshoe having been cured in situ on said horse hoof from an intimate curable mixture of urethane resin precursors comprising diphenylmethane diisocyanate and polyoxypropylene oxide polyol and meta xylene diamine deposited on said hoof at a depth and width profile approximating the intended horseshoe shape.

33. A method for building a animal hoof shoe of an intended shape in situ including cleaning the surface of the shoe area of hoof of debris, extruding onto the cleaned hoof surface from a common mix tip communicating with separate reactive resin precursors in first and second chambers a flowable hoof shoe preform comprising an intimate curable mixture of said reactive resin precursors at a profile depth and width generally conforming to said intended hoof shoe shape, adhering said mixture to said shoe area surface, curing said mixture to a non-flowable mass by reaction of said resin precursors within less than about two minutes, and locally shaping said hoof shoe mass to modify its extruded profile to said final intended hoof shoe shape on said surface.

34. The hoof shoe product of claim 33.

35. A synthetic organic resin hoof shoe cured in situ on a hoof surface.

36. A method of protecting a horse hoof from uneven pressure on the hoof from horseshoe, including clearing from the hoof all nails and previous shoe, and forming on the cleaned hoof an adherent resin mass that adheres to the hoof surface in shoe-forming relation.

37. A method of maintaining a horse hoof shoe against wearing from an intended shape, including cleaning the shoe surface of debris, and restoring the intended shape to the shoe through the added application of an adherent resin mass that adheres to the hoof surface.

38. A synthetic organic resin hoof shoe hardened in situ on a hoof, said resin exhibiting an optical effect other than its natural appearance.

* * * * *